United States Patent [19]

Le Bail et al.

[11] Patent Number: 4,991,445
[45] Date of Patent: Feb. 12, 1991

[54] APPARATUS FOR MEASURING THE DEFORMATION OF AN OBJECT SUBJECTED TO STRESSES

[75] Inventors: Michel Le Bail, Versailles; Hubert Vaillant De Guelis, Aubergenville, both of France

[73] Assignee: Aerospatiale Societe Nationale Industrielle, France

[21] Appl. No.: 458,995

[22] Filed: Dec. 29, 1989

[30] Foreign Application Priority Data

Dec. 30, 1988 [FR] France ................................ 88 17516

[51] Int. Cl.$^5$ ................................................ G01L 5/00
[52] U.S. Cl. ........................................... 73/800; 356/32
[58] Field of Search ................... 73/788, 800; 356/32, 356/23, 142, 252, 373; 33/707

[56] References Cited

U.S. PATENT DOCUMENTS 3,383,980 5/1968 Richter .
3,985,444 10/1976 Takashima et al. ............... 356/32 X

FOREIGN PATENT DOCUMENTS 1307291 4/1987 U.S.S.R. ................................ 73/788

OTHER PUBLICATIONS

FR-A-816 087 (EPARVIER et al.), p. 1, lignes 32-42; p. 4, ligne 3, p. 5, ligne 56; Figures.
Patent Abstracts of Japan, vol. 10, No. 30, (P-426)[2087], 5 fevrier 1986; and JP-A-60 181 604, (Toyoda Gosei K.K.) 17-09-1985, Resume Strength of Materials, vol. 7, No. 9, Sep. 1975, pp. 1147-1148. Plenum Ostapchuk: "A Device for Measuring the Rim Displacement of Turbine Rotors".
DE-a-2 636 429 (Fraunhofer) En entier.
Patent Abstracts of Japan, vol. 7, No. 150, (P-207)[1295], 30 juin 1983 and JP-A-58 62 504 (Oputo Kugiyou K.K.) 14-04-1983.
Patent Abstracts of Japan, vol. 11, No. 126 (P-569)[2573], 21 avril 1987 and JP-A-61 269 005 (Science & Tech. Agency) 28-11-1986 resume.

Primary Examiner—Jerry W. Myracle
Attorney, Agent, or Firm—Hayes, Soloway, Hennessey & Hage

[57] ABSTRACT

The deformations of an object subjected to stresses are measured, said object being, for example, an inertia wheel revolving at high speed inside a vacuum chamber, light pulses emitted by a stroboscope and synchronized with the rotation speed of the object are directed onto this object. The still frames or freezes thus formed are issued from the chamber through a circular aperture via a first large focal length objective. On the full scale real images thus obtained within a plane, a reticule is superimposed and the images of the object and of the reticule are increased by means of a second objective. A video camera connected to a screen and a recorder makes it possible to directly display and/or store the images of the deformations sustained by the object.

8 Claims, 1 Drawing Sheet

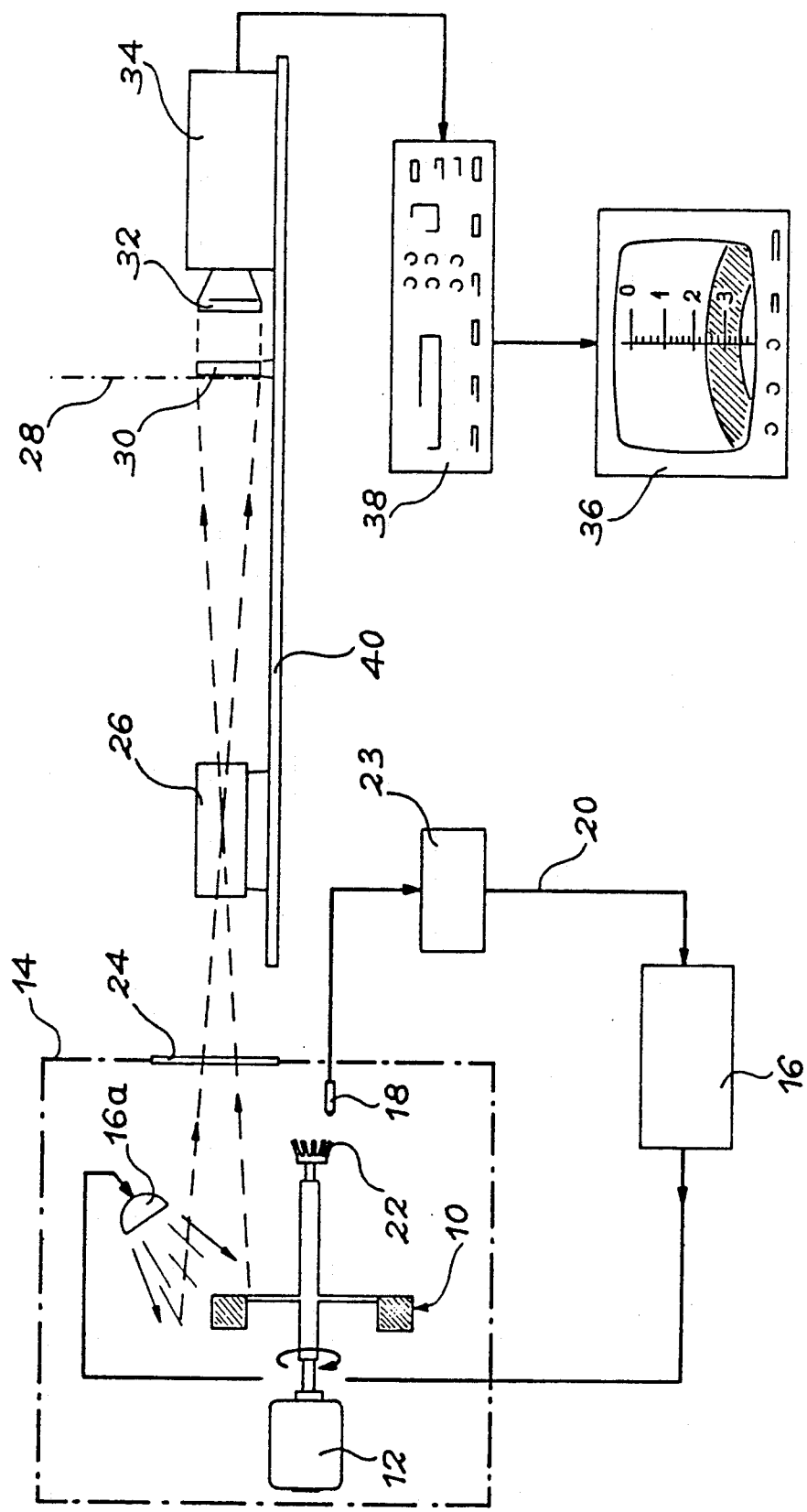

APPARATUS FOR MEASURING THE DEFORMATION OF AN OBJECT SUBJECTED TO STRESSES

BACKGROUND OF THE INVENTION

1. Field of the Invention

The invention concerns an apparatus making it possible to measure long distance the deformations of an object subjected to stresses, the object being, for example, an inertia wheel revolving at high speed in an vacuum chamber.

2. Description of the Related Art

Such an apparatus is designed to study the behavior of parts subjected to stresses, whether these parts be revolving parts or non-revolving parts subjected, for example, to alternate vibrations or displacements, whenever it is desired to know the maximum amplitudes concerning these parts.

In particular, the apparatus of the invention may be used to study the behavior of the rotors of kinetic energy storage systems, said rotors being used on space instruments, such as man-made satellites, so as to provide the devices put on board these instruments with the energy required for their functioning when these instruments or satellites are in a shadow zone. These kinetic energy storage systems have been developed with the aim of replacing electric batteries which used to constitute the main power source of satellites and represented a considerable on board weight.

The rotor or inertia wheel of such a kinetic energy storage system is composed of several functional elements whose effective element is a wheel rim driven at a high rotation speed (about 30,000 rpm for a diameter of 600 mm) so as to obtain a high kinetic energy per unit of mass. This wheel rim is connected by arms to a central hub supported by magnetic suspension. In addition, static and dynamic balancing means are provided.

Having regard to the extremely high rotation speed of the rotor under vacuum, the centrifugal stresses exerted on the rotor are considerable. A knowledge of the behavior of rotors subjected to such stresses constitutes an important element as regards the design of these rotors. In particular, it is desirable to be able to accurately measure deformations, such as the elongation and distension of rotors revolving at high speed.

So as to carry out such measurements, there currently exist several installations making it possible to restore on the ground the operating conditions of the rotor in space by placing this rotor in a vacuum chamber and by making it revolve at high speed inside this chamber.

Some of these apparatus make use of eddy current displacement transducers. However, these transducers cannot be used when the rotor does not comprise any conductive surface or when the environment of the rotor is a conductive medium. Moreover, the shape, dimensions and the nature of the materials constituting the rotor affect the impedance of the coil of the transducer and, as a result, the quality of the measurement. Furthermore, given the fact that the measurement carried out is an average of the respective elongations of the rotor, it lacks accuracy to a large extend.

In addition, the use of eddy current displacement transducers also results in measurement errors owing to thermal derivatives, which are made up for on the transducer but not on the rotor. Accordingly, the magnetic permeability of the rotor varies with the temperature, the same applying to its resistivity when the thickness of the rotor is less than the penetration depth of eddy currents. Measurement errors also occur when the bending radii of the rotors are too large with respect to the size of the transducer or when the surfaces of the rotors are smaller than those of the transducer. All these causes of errors make it necessary to calibrate the transducer according to the temperature of the rotor. Accordingly, the device needs to be calibrated for each form of rotor and each type of material. This calibration requires several adjustment parameters in order to use these transducers, this implementation proving to be particularly delicate.

Some of known measurement apparatus include in particular optical installations functioning on the basis of a black/white contrast measurement. As with those apparatus using eddy current transducers, this measurement is an average and results in a considerable loss of precision. Moreover, these apparatus present difficulties in sue and involves problems regarding calibration and lighting. Furthermore, they are relatively expensive to implement.

Other known apparatus do not make it possible to carry out a deformation measurement but merely display these deformations by means, for example, of a video system. However, these apparatus have the drawback of being limited by virtue of the number of images emitted during image recording. Furthermore, no measurement is made and no item of data is recorded.

So as to carry out measurements of the deformation of a rotor revolving at high speed in a vacuum chamber, it is possible to use other methods, such as interferometry using the working difference between two optical path lengths or laser range finding. However, these methods also present difficulties as regards implementation and application, as, generally speaking, they are delicate to handle.

SUMMARY OF THE INVENTION

The object of the invention is to provide an apparatus making it possible to measure the deformation of an object subjected to stresses, said object being, for example, a rotor revolving at high speed in a vacuum chamber, providing high precision in all respects, this installation being easy to implement and allowing for the direct display of measurements and/or their recording at will.

According to the invention, this result is obtained by means of an apparatus for measuring the deformation of an object subjected to stresses, wherein the apparatus includes:

(1) a first objective forming a real image of the object on scale 1;

(2) a graduated reticule placed at the location of said real image;

(3) a second objective placed beyond the real image with respect to the first objective and forming enlarged images of the real image and the reticule; and (4) means for observing said enlarged images making it possible, by comparing the enlarged images of the reticule and of the real image, to measure the deformations of the latter and accordingly of the object.

In the particular case of an object revolving at high speed, such an apparatus further includes:

(5) a vacuum chamber suitable for receiving said object;

(6) a stroboscope delivering light pulses directed onto the object;

(7) means to synchronize the frequency of said light pulses with the speed of the object;

the first objective being placed outside the chamber in front of a circular aperture of the latter so as to form the real image of the object outside the chamber.

Advantageously, so as to make it possible to observe the various zones of the object, the apparatus further includes a device for phase shifting the light pulses delivered by the stroboscope.

Although any observation means may be used, such as a screen, a camera or other devices, these observation means preferably should include a video camera connected to a video recorder connected to a video screen.

BRIEF DESCRIPTION OF THE DRAWING

The FIGURE illustrates a preferred embodiment of the invention which shall now be described, given by way of example being in no way restrictive, with reference to the accompanying drawing in which the sole figure diagrammatically represents an apparatus according to the invention and applied to the measurement of the deformations of a rotor revolving at high speed.

DETAILED DESCRIPTION OF THE PREFERRED EMBODIMENTS

On the FIGURE, the reference 10 denotes a rotor or inertia wheel designed to be used as a kinetic energy storage system on a man-made satellite. So as to make it possible to measure and display the elongation and distension of this rotor 10 before being mounted on the satellite, this rotor is placed on a measuring apparatus on the ground, said apparatus being embodied according to the invention and conceived so as to restore on the ground the operating conditions of the rotor encountered in space.

To this effect, the rotor 10, as well as an air turbine 12 enabling the rotor 10 to be rotary-driven at high speed, are placed inside a sealed chamber 14 in which a high vacuum has been created with the aid of a vacuum circuit (not shown). In these conditions, the rotation speed of the rotor 10 may, without virtually any overheating, reach values of about 30,000.00 rpm for a diameter of 600 mm. These values are comparable to those reached in space so that the measurements carried out are representative of the functioning of the rotor on the satellite.

The measuring apparatus of the invention firstly includes a stroboscope 16 placed outside the chamber 14. The stroboscope 16 makes it possible to artificially via a stroboscopic effect stop the image of a specific zone of the wheel rim constituting the peripheral section of the rotor 10 by periodically delivering light pulses directed onto this section with the aid of a lamp 16a placed inside the chamber 14.

So that the light pulses emitted by the stroboscope are synchronized with the rotation speed of the rotor 10 at any moment, the functioning of the stroboscope 16 is controlled from a transducer 18 connected to the stroboscope by a conductor 20 and placed opposite coding apertures 22 integral with the hub of the rotor 10. Thus, it is possible to accurately observe the behavior of the rotor during the acceleration phase. Synchronization may in particular be effected so that the stroboscope 16 delivers 60 light pulses per revolution of the rotor 10.

So as to make it possible to observe the various zones of the rotor, an automatic control system 23 constituted by a static phase shifter is placed on the conductor 20 between the transducer 18 and the stroboscope 16. This system allows for fine control of the angular displacement of the light pulses delivered by the stroboscope.

The freezes or still frames of the rotor 10 thus formed with the aid of the stroboscope 16 then need to be issued from the vacuum chamber 14 so that the measurements and observations can be made outside this chamber.

To this effect, the chamber 14 comprises a circular aperture 24 opposite the zone of the rotor 10 subjected to the light pulses delivered by the lamp 16a of the stroboscope. Behind this circular aperture 24, a wide focal objective is placed, this aim of this being to form outside the chamber 14 a scale 1 real image of each of the freezes of the rotor obtained with the aid of the stroboscope. The focal length of the objective 26 is determined according to the distance separating the rotor 10 from the circular aperture 24, this objective 26 being placed immediately behind the latter. Given the fact that in practice this distance is usually close to 1 m, the focal length of the objective 26 is between about 300 mm and about 400 mm. The figure shows the plane in which the scale 1 real image forms, each of the freezes of the rotor obtained with the aid of the stroboscope 16 being denoted by the reference 28.

So that the real image formed on scale 1 inside the plane 28 is then able to be a base for a precise measurement, a graduated reticule 30 is also placed inside the plane, said reticule being superimposed on the real image.

The superimposed images of the rotor and reticule situated inside the plane 28 are then recovered by a short focal length objective 32, the aim of the latter being to ensure the enlargement of these images before being used. An objective 32 with a focal length of between about 25 mm and about 38 mm may also be used.

In the embodiment represented, a video camera 34 is placed behind the objective 32, the distance between the sensitized face of the camera 34 and the objective 32 being roughly sufficient so as to obtain an enlargement of between about 100 and about 300 times.

So as to allow for the direct display of the enlarged image of the section of the rotor situated on the optical path of the apparatus on which the enlarged image is superimposed according to the same proportions as the reticule 30, the video camera 34 is connected to a video screen 36. A real time display and measurement of the deformation phenomena of the rotor under the effect of its high speed rotation are thus effected.

In addition, a video recorder 38 is preferably inserted between the camera 34 and the screen 36 so as to allow for a storage of the image for subsequent utilization.

The reticule 30 may in particular be graduated in tenths of a millimeter, one tenth of a millimeter being able to be represented by 30 mm on the screen 36. Precise measurements of the deformations of the rotor, such as its elongation and distension under the effect of the centrifugal stresses it undergoes, may thus be carried out, either directly on the video screen 36, or subsequently on the recorder 38, or by using either of these techniques.

The foregoing description shows that the measuring apparatus of the invention is particularly simple and it especially easy to use. Moreover, the disposition of all the devices of the apparatus namely ranging from the stroboscope 16 to the recorder 38 outside the vacuum chamber 14, makes it possible to use a chamber with small dimensions in which a high-quality vacuum can be quickly obtained, whilst facilitating the use of the devices.

As shown on the FIGURE, the two objectives 26 and 32, as well as the reticule 30 and the video camera 34, are placed on a given optical bench 40 making it possible to carry out adjustments of the distances between these various devices and the distance separating the objective 26 from the rotor 10 to be displayed.

The only adjustments to be carried out on this bench 40 concern the distance separating the rotor 10 from the objective, which determines the sharpness of the image, and the distances respectively separating the objective 32 from the objective 26 and from the sensitized face of the camera 34, which determine the enlargement obtained with the aide of the objective 32. The first of these adjustments is carried out on the measuring bench, whilst the second adjustment is carried out in the laboratory. It ought to be mentioned that the distance separating the objective 26 from the plane in which the graduated reticule 30 is placed is fixed once and for all so that the image at the reticule is on scale 1.

Of course, the invention is not merely limited to the embodiment described above, but covers all its variants. In particular, the images of the rotor and the reticule both enlarged by the objective 32 may also by observed by means other than by the video camera 24, the screen 36 and the recorder 38. Consequently, depending on the exploitation which needs to be made of these images, said images may be formed directly on a screen placed behind the objective 32 or even picked up by a photographic device or a cinematographic camera.

Furthermore, it goes without saying that it is possible to add to the apparatus described above any means making it possible to display on a screen, such as the screen 36, or record at any moment the value detected by the transducer 18 of the rotation speed of the rotor 10.

Finally, the apparatus of the invention may be used to measure the deformations of any object subjected to stresses. If these stresses are not induced by a rapid movement of the object as in the application described, the stroboscope and the synchronization means associated with it may therefore be suppressed. In addition, the use of an vacuum chamber is only justified when the object is subjected to a rapid movement which might overheat said object.

What is claimed is:

1. An apparatus to measure the deformations of an object subjected to stresses and comprising:
   (a) a first objective forming a real image of the object on scale 1;
   (b) a graduated reticule placed at the location of said real image;
   (c) a second objective placed beyond the real image with respect to the first objective and forming enlarged images of the real image and the reticule; and (d) means for observing said enlarged images of the real image and the reticule, thus permitting the measurement of the deformations of the real image, and thus of the object under stress, by comparing the enlarged images on the observing means.

2. Apparatus according to claim 1 and applied to the measurement of the deformation of an object revolving at high speed and further including:
   (a) a vacuum chamber suitable to receiving said object;
   (b) means for revolving said object of high speed;
   (c) a stroboscope delivering light pulses directed onto the object;
   (d) means to synchronize the frequency of said light pulses with the speed of the object; the first objective being placed outside the chamber in front of a circular aperture of said chamber so as to form the real image of the object outside the chamber.

3. Apparatus according to claim 2 and further including a device for the phase shifting of the light pulses delivered by the stroboscope.

4. Apparatus according to claim 2, wherein said means to synchronize the frequency of the light pulses with the rotation speed of the object are adjusted so that the stroboscope delivers 60 pulses per revolution of the object.

5. Apparatus according to claim 1, wherein the first objective has a focal length of between about 300 mm and about 400 mm.

6. Apparatus according to claim 1, wherein the second objective has a focal length of between about 25 mm and about 38 mm.

7. Apparatus according to claim 1, wherein the enlargement of the images enlarged with respect to the real image and to the reticule are between about 100 times and about 300 times.

8. Apparatus according to claim 1, wherein said observation means include a video camera connected to a video recorder connected to a video screen.

* * * * *